No. 839,433. PATENTED DEC. 25, 1906.
P. J. J. B. & A. C. B. SORENSEN.
THEODOLITE.
APPLICATION FILED MAR. 20, 1906.

2 SHEETS—SHEET 1.

Witnesses
Inventors
P. J. J. B. Sorensen
A. C. B. Sorensen
By
Attorneys

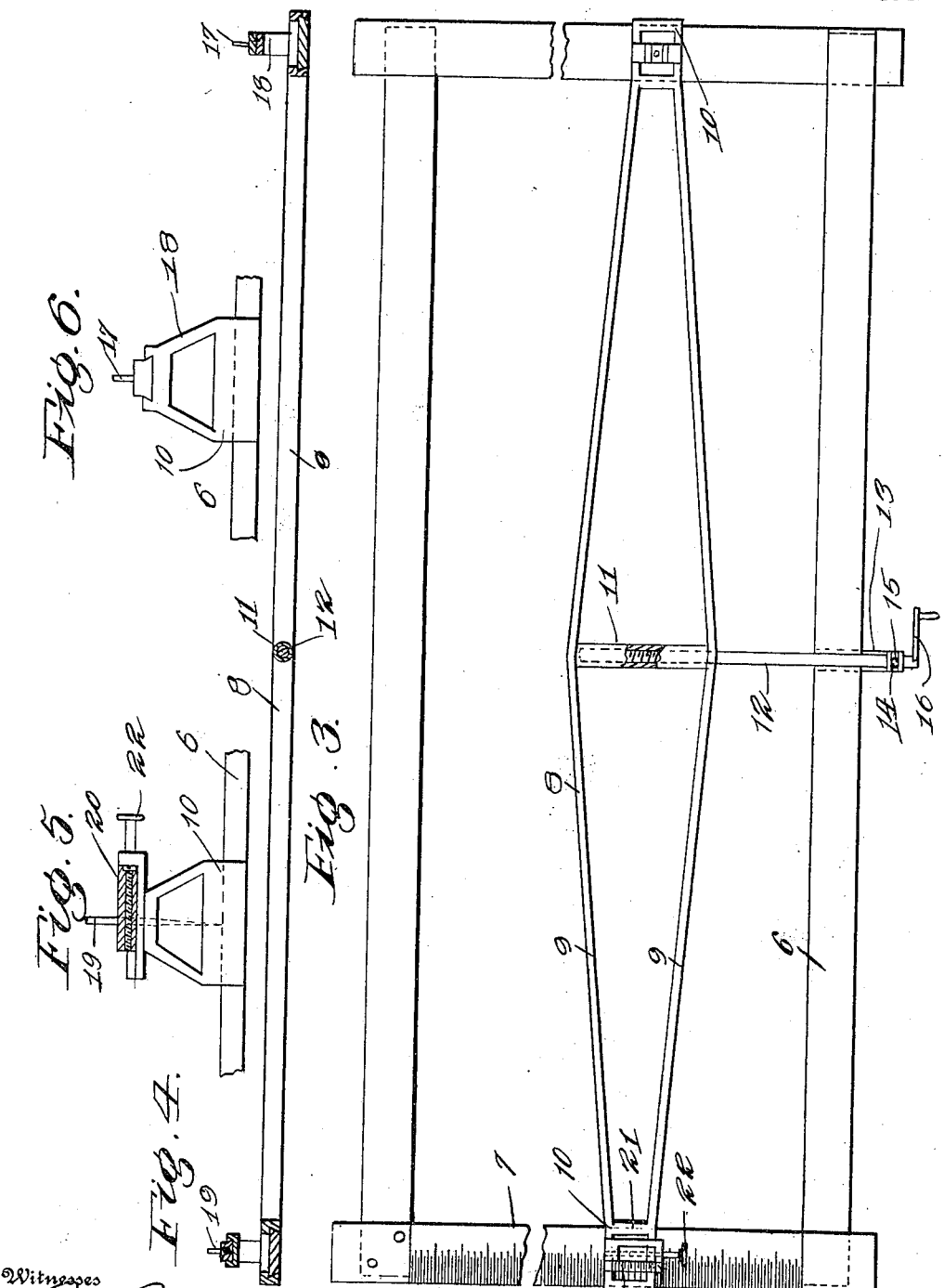

UNITED STATES PATENT OFFICE.

PETER J. J. B. SORENSEN AND ALFRED C. B. SORENSEN, OF GREEN BAY, WISCONSIN.

THEODOLITE.

No. 839,433.  Specification of Letters Patent.  Patented Dec. 25, 1906.

Application filed March 20, 1906. Serial No. 307,056.

*To all whom it may concern:*

Be it known that we, PETER J. J. B. SORENSEN and ALFRED C. B. SORENSEN, subjects of Frederick VIII, King of Denmark, residing at Green Bay, in the county of Brown and State of Wisconsin, have invented certain new and useful Improvements in Theodolites, of which the following is a specification.

This invention relates to certain new and useful improvements in theodolites; and the object of the invention is to provide a simple construction of an instrument of this character which will embody few parts and will be durable and efficient in operation for holding and adjusting a telescope for the purpose of measuring altitudes and distances and triangulations with a maximum degree of accuracy that will be sufficiently correct for all practical purposes where a comparatively inexpensive instrument is required.

For a full description of the invention and the merits thereof and also to acquire a knowledge of the details of construction of the means for effecting the result reference is to be had to the following description and accompanying drawings, in which—

Figure 1:
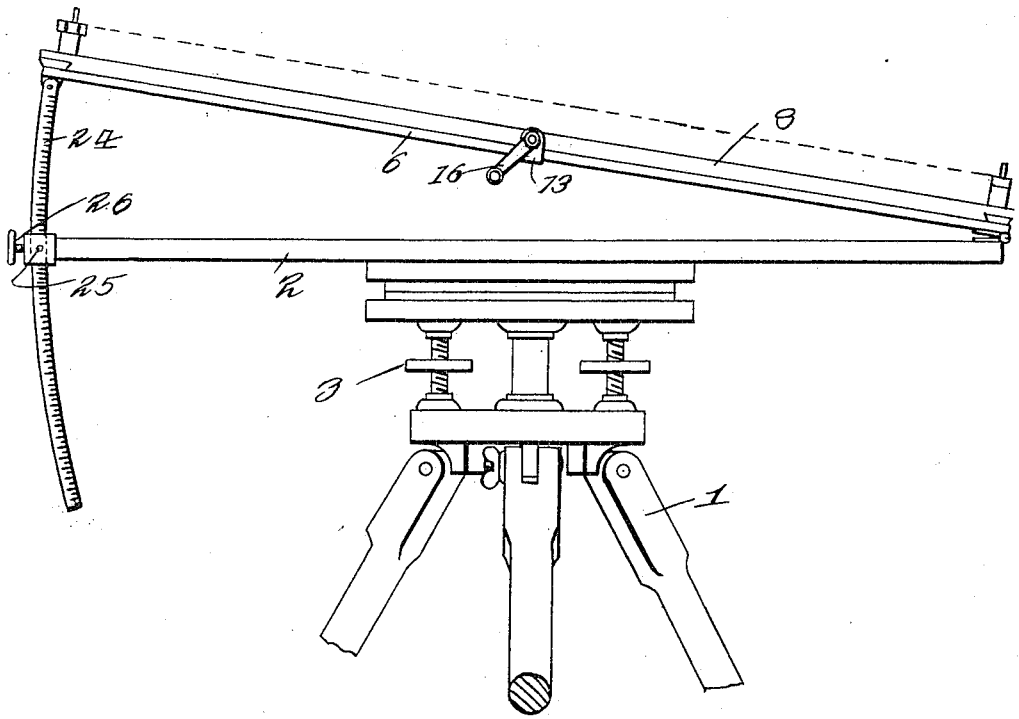
Figure 2:
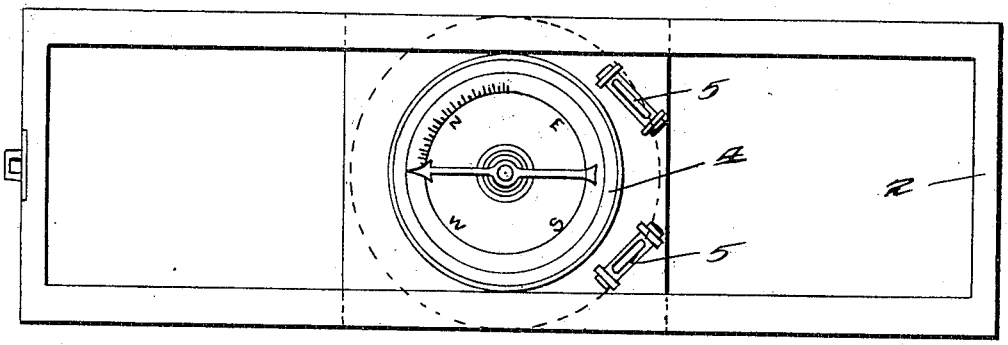

Figure 1 is a side elevation of our improved instrument. Fig. 2 is a top plan view of the main frame thereof. Fig. 3 is a similar view of the hinged frame. Fig. 4 is a side elevation, partly in section, of the carriage for properly supporting the telescope. Figs. 5 and 6 are end views of the said carriage.

Corresponding and like parts are referred to in the following description and indicated in all the views of the drawings by the same reference characters.

Referring to the drawings, the numeral 1 designates a support for the instrument, which in the present instance comprises a tripod that may be of any desired make or design and so arranged that it may be used for the purpose of obtaining by a computing-scale and vernier altitudes and triangulations of plain surveys.

Mounted upon the tripod 1 is a preferably rectangular frame 2, securely fastened to the tripod by means of the adjustable leveling-screws 3. In the center of the frame 2 is a compass 4, preferably graduated with a vernier (not shown) for close reading and adjustment. One or more spirit-levels 5 are also mounted on said frame. The frame 2 is of course mounted upon the head of the tripod, so that it may revolve in a horizontal plane thereon. Another frame 6, also preferably rectangular and of a width preferably equal to the width of the frame 2, is hinged at one end to one end of the frame 2, so that it is supported thereon in a manner to swing about its hinged end as an axis and in a vertical plane. The frame 6 has one of its bars 7 marked off as a scale in fractions of an inch from one end to the other, preferably making twenty-four inches as a total distance the carriage 8 may move within the frame 6.

The carriage 8 preferably comprises two slightly-bowed members 9, connected together at their ends by preferably integral boxes 10, that are mounted to slide on the end bars of the frame 6, as by the undercut-groove connection illustrated in Fig. 1, so that the carriage 8 may be moved laterally within the said frame. Two members 9 of the carriage 8 are also connected together by means of a tubular transverse rod 11 at their middle, said rod being internally screw-threaded, as shown.

The actuating-shaft 12 is provided with exterior screw-threads, which mesh with the interior threads of the tubular rod 11, and the shaft 12 is mounted adjustably near one end in a bearing in a lateral bracket 13, projecting from one side bar of the frame 6. A set-screw 14, working in a washer 15, is utilized, in the present instance, for the purpose of holding the actuating-shaft 12 in its properly-adjusted position. The shaft 12 is provided with an actuating crank-handle 16, by the manipulation of which, as is manifest, the carriage 8 may be moved laterally in either direction across the frame 6. The carriage 8 is provided at its ends with means for adjustably supporting a telescope. In the present instance this means is constituted at one end of the carriage by a vertically-extending pin 17, supported by a frame or bracket 18, mounted on or secured to one of the boxes 10 of the said carriage, and at the other end of the carriage this means is constituted by a similar pin 19, secured to a block 20, mounted to slide laterally between two cross-arms 21 of the box 10 at that end of the carriage. The laterally-sliding movement of the block 20 is effected by means of a screw-threaded bolt provided with a thumb-nut 22. One of the guide-arms 21 for the block 20 is provided with a graduated scale, as indicated at 23.

The proportions of the parts are such that the thumb-nut 22 will shift the block 20, and consequently that end of the telescope which is supported thereby, one thirty-second of an inch for each full turn of the nut. Furthermore, the nut is marked off, preferably in eight parts, so that the telescope can be shifted eight times more finely than one-thirty-second of an inch or one-two hundred-and-fifty-sixth of an inch for each one-eighth turn of the nut.

The free end of the frame 6 has secured to it a depending segment-shaped bar 24, which passes through a box 25 in one end of the frame 2. This bar 24 may be held at different vertical positions by means of a set-screw 26, working in the box 25. The said bar has a computing-scale thereon, which gives the altitudes above the base-line as seen through the telescope.

In the practical use of the device it is obvious that the telescope may be shifted revolubly by turning the frame 2 in a horizontal plane on the tripod 1, that the proper inclination for the telescope may be effected by adjusting the frame 6 in a vertical plane by means of the bar 24 and box 25 and set-screw 26 and that the proper lateral adjustment of the telescope may be effected by shifting the carriage 8 laterally in the frame 6 and by also manipulating the set-screw 22. By this combined means the telescope may be correctly adjusted by the vernier, and the distance between two objects may be readily determined in the manner ordinarily employed with instruments of this character.

From the foregoing description, in connection with the accompanying drawings, it will be seen that we have provided an improved adjustable support for surveying-telescopes, which embodies few and simple parts that can be cheaply manufactured and assembled and which will be durable in construction and efficient in operation for all practical purposes where an inexpensive instrument is required.

Having thus described the invention, what is claimed as new is—

1. A device of the character described, comprising a support, a frame mounted to turn in a horizontal plane on said support, a second frame pivotally connected to said first-named frame and mounted to move in a vertical plane, means for securing said second frame at different inclinations with respect to the horizontal, and a laterally-adjustable carriage mounted on said second frame and provided with means for supporting a telescope thereon.

2. A device of the character described comprising a support, a frame mounted to turn in a horizontal plane on said support and provided with means for determining the different horizontally-adjusted positions, a frame pivotally connected at one end to the first-named frame and provided at its other end with a depending bar said bar being adjustably connected to the first-named frame and provided with a scale by which it is intended to compute altitudes, and a laterally-adjustable carriage mounted on said pivoted frame and provided with means for supporting a telescope thereon.

3. A device of the character described comprising a support, a frame mounted to turn in a horizontal plane on said support and provided with means for determining the different horizontally-adjusted positions, a frame pivotally connected at one end to the first-named frame and provided at its other end with a depending bar, said bar being adjustably connected to the first-named frame and provided with a scale by which it is intended to compute altitudes, a carriage laterally adjustable on said pivoted frame and provided at one end with means for supporting one end of a telescope, and a laterally-adjustable block secured to the other end of said carriage and designed to support the other end of a telescope.

4. A device of the character described, comprising a support, a frame revolubly mounted in a horizontal plane on said support and provided with means for determining its different horizontal positions, a second frame hinged at one end to the first-named frame, a depending segment-shaped bar connected to the other end of the hinged frame and adjustably connected to the end of the first-named frame, said bar being provided with a scale for computing altitudes, a carriage slidably mounted at its ends on the end bars of the hinged frame, means for adjusting said carriage laterally on said hinged frame, and means for supporting a telescope on said carriage, one end bar of the hinged frame containing a scale, as and for the purpose set forth.

5. A device of the character described, comprising a support, a frame revolubly mounted to turn in a horizontal plane on said support and provided with means for determining its different horizontal positions, a second frame hinged to the first-named frame and arranged to swing in a vertical plane, means for securing said hinged frame at different inclinations to the horizontal, a carriage having its ends slidably mounted on the end bars of the hinged frame and provided with a tubular and transverse rod, said rod being internally screw-threaded, and a longitudinally-adjustable actuating-shaft secured to the hinged frame and having a threaded engagement with the said tubular rod.

6. A device of the character described, comprising a support, a horizontally-revoluble frame thereon, a vertically-movable hinged frame supported by the first-named frame, means for securing the hinged frame at different inclinations with respect to the horizontal, a laterally-adjustable carriage mounted in the hinged frame, means for adjusting said carriage, one end of said carriage being provided with an upwardly-projecting pin designed to support one end of a telescope, a laterally-slidable block mounted in the other end of said carriage and provided also with a pin designed to support the other end of a telescope, and means for adjusting said block, said means including a graduated thumb-nut, as and for the purpose set forth.

7. A device of the character described, comprising a support, a horizontally-revoluble frame thereon, a vertically-movable hinged frame supported by the first-named frame, means for securing the hinged frame at different inclinations with respect to the horizontal, a laterally-adjustable carriage mounted in the hinged frame, means for adjusting said carriage, the one end of said carriage being provided with an upwardly-projecting pin designed to support one end of a telescope, a laterally-slidable block mounted in the other end of said carriage and provided also with a pin designed to support the other end of the telescope, and means for adjusting said block.

In testimony whereof we affix our signatures in presence of two witnesses.

PETER J. J. B. SORENSEN. [L. s.]
    ALFRED C. B. SORENSEN. [L. s.]

Witnesses:
 D. J. WITTIG,
 ELMER S. HALL.